United States Patent
Palliser et al.

(10) Patent No.: US 6,739,541 B2
(45) Date of Patent: May 25, 2004

(54) SEAT BELT RETRACTOR WITH LOAD LIMITING

(75) Inventors: Martyn Neil Palliser, Carlisle (GB); John Bell, Carlisle (GB)

(73) Assignee: Key Safety Systems, Inc., Sterling Heights, MI (US)

( * ) Notice: Subject to any disclaimer, the term of this patent is extended or adjusted under 35 U.S.C. 154(b) by 83 days.

(21) Appl. No.: 10/241,483

(22) Filed: Sep. 12, 2002

(65) Prior Publication Data

US 2003/0192978 A1 Oct. 16, 2003

(30) Foreign Application Priority Data

Apr. 16, 2002 (GB) .............................................. 0208700

(51) Int. Cl.[7] .............................................. B65H 75/48
(52) U.S. Cl. .................................................... 242/379.1
(58) Field of Search ...................... 242/379.1; 280/805, 280/806; 297/470, 471, 472

(56) References Cited

U.S. PATENT DOCUMENTS

| | | | | |
|---|---|---|---|---|
| 4,088,280 A | * | 5/1978 | Arlauskas et al. | 242/379.1 |
| 5,618,006 A | * | 4/1997 | Sayles | 242/379.1 |
| 5,772,144 A | * | 6/1998 | Tanabe et al. | 242/379.1 |
| 5,788,177 A | | 8/1998 | Keller et al. | 242/379.1 |
| 5,924,641 A | | 7/1999 | Keller et al. | 242/379.1 |
| 5,934,597 A | * | 8/1999 | Ludwig | 242/379.1 |
| 5,975,451 A | * | 11/1999 | Kawamoto | 242/379.1 |
| 6,131,843 A | * | 10/2000 | Singer et al. | 242/379.1 |
| 6,216,972 B1 | * | 4/2001 | Rohrle | 242/379.1 |
| 6,254,191 B1 | * | 7/2001 | Yamamoto et al. | 297/478 |
| 6,481,660 B2 | * | 11/2002 | Nagata et al. | 242/379.1 |
| 6,592,064 B2 | * | 7/2003 | Clute et al. | 242/379.1 |
| 6,598,822 B2 | * | 7/2003 | Nagata et al. | 242/379.1 |
| 2001/0008262 A1 | | 7/2001 | Huber | 242/379.1 |

FOREIGN PATENT DOCUMENTS

| | | |
|---|---|---|
| EP | 1149743 | 4/2001 |
| JP | 10-297426 | 11/1998 |

* cited by examiner

*Primary Examiner*—William A. Rivera
(74) *Attorney, Agent, or Firm*—Lonnie Drayer; Jarett Rieger

(57) ABSTRACT

A seat belt retractor has a spool mounted for rotation in the retractor, for retraction or pay-out of seat belt webbing depending upon the rotation direction of the spool. A locking ring is attached to one end of the spool. A locking pawl locks the locking ring against rotation when a crash is sensed. Load limiting is provided by a length of wire and a winding drum attached to one of the spool and the locking ring and a pin fixed to the other of the spool and the locking ring. The wire is coiled around the pin and arranged so that when there is relative movement between the spool and the locking ring, then the wire is pulled around the pin and is wound onto the winding drum.

18 Claims, 5 Drawing Sheets

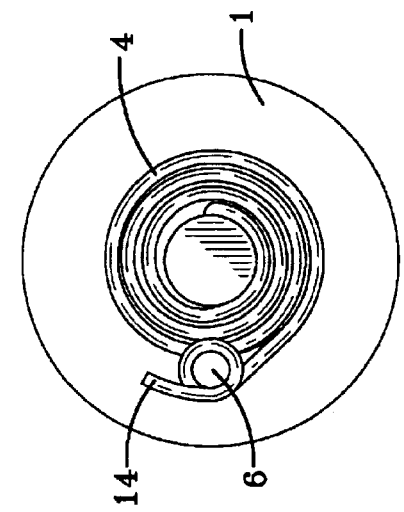
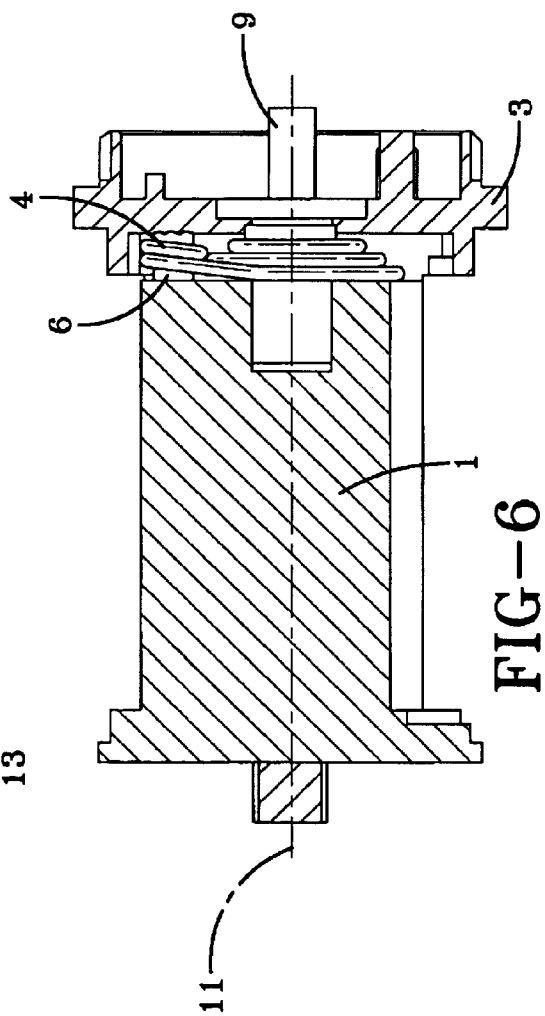
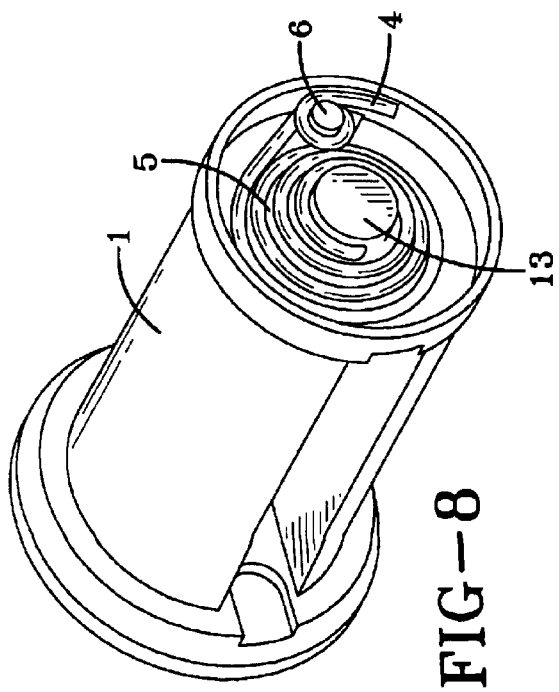

SEAT BELT RETRACTOR WITH LOAD LIMITING

FIELD OF THE INVENTION

The present invention relates to a seat belt retractor with load limiting.

BACKGROUND OF THE INVENTION

A seat belt retractor generally comprises a cylindrical bobbin or spool with a circular cross-section. Seat belt webbing is attached to and wound around the spool. The spool is mounted on a spool shaft to be rotatable in the retractor to wind in webbing under action of a retractor spring and to pay out webbing under the influence of relatively gentle forwardly directed movement of a vehicle occupant, for example normal movement associated with reaching the controls for a radio or a window or to reach a glove compartment or door pocket. In a crash the more extreme momentum of the vehicle occupant activates a crash sensor that locks the spool against rotation and prevents forward motion of the vehicle occupant and collisions with the interior fixtures of the vehicle. However, this sudden locking of the seat belt spool in a crash can sometimes cause injury to the vehicle occupant due to sudden impact of the torso with the belt webbing. In recent years this problem has been recognized and some solutions proposed.

One known solution is to effect load limiting by interposing a plastically or elastically deformable member in the force path. For example, a torsion bar may be incorporated into the spool. A torsion bar is made of steel that twists when high torque is applied to it and can rotate up to seven or eight times before breaking. It is connected to both ends of a split spool. One end of the spool is held against rotation by a locking ring engaged by a load bearing pawl in a crash. The other end of the spool is prevented from rotating by its connection to the locking ring via the torsion bar, but when the crash forces exceed a predetermined level the torsion bar will twist and allow a limited controlled further pay-out of belt webbing. The additional pay-out of belt webbing is generally in proportion to the momentum of the vehicle occupant at the moment of a crash. This pay-out of belt webbing lessens the otherwise severe restraining forces on the vehicle occupant at high vehicle speeds, especially during the initial moments of a crash.

However torsion bars are complex and expensive to make, and are not easily adaptable to different conditions, such as different vehicle characteristics, or different sizes and weights of vehicle occupants. There is a need for a cheaper and less complex load limiting system.

SUMMARY OF THE INVENTION

There is provided in accordance with one aspect of the invention a seat belt retractor comprising: a spool mounted for rotation in the retractor; a locking ring attached to one end of the spool; a locking pawl for locking the locking ring against rotation in a crash; and load limiting means for allowing further pay-out of the seat belt webbing under the influence of a vehicle occupant's forward momentum after the locking ring has locked, wherein the load limiting means comprises a length of wire and a winding drum attached to one of the spool and the locking ring and a pin fixed to the other of the spool and the locking ring, wherein the wire is coiled around the pin and arranged so that when there is relative movement between the spool and the locking ring the wire is pulled around the pin and is wound onto the winding drum.

BRIEF DESCRIPTION OF THE DRAWINGS

FIG. 6 is a cross sectional view of the spool of FIGS. 2 to 5 after load limiting.

FIG. 7 is an end view of the spool of FIG. 6.

FIG. 8 is a perspective view of the spool of FIGS. 6 and 7.

DETAILED DESCRIPTION OF THE INVENTION

Figure 1:
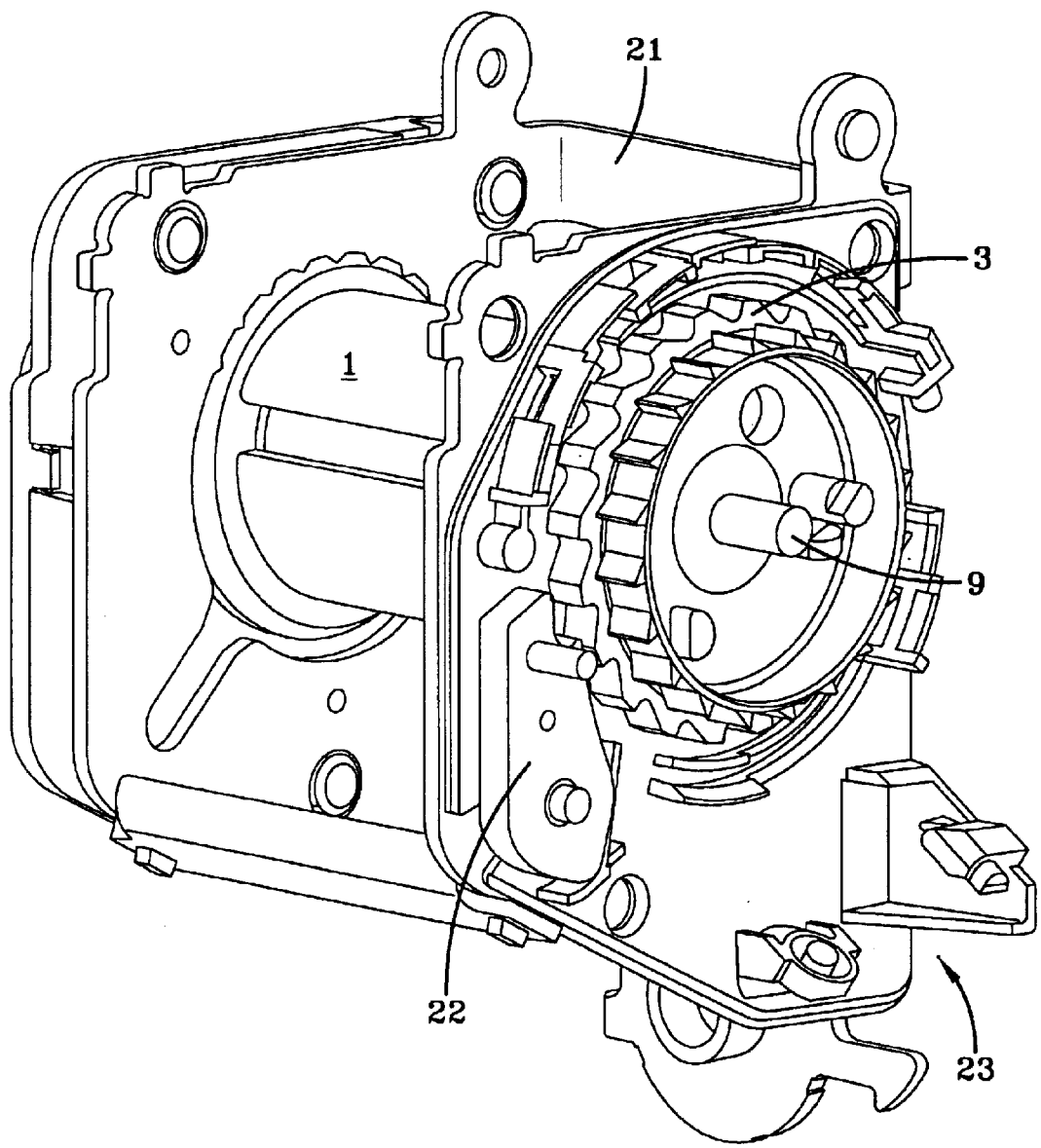
FIG. 1 is a perspective view of a seat belt retractor according to the present invention including a spool of the type shown in subsequent figures.
Figure 3:
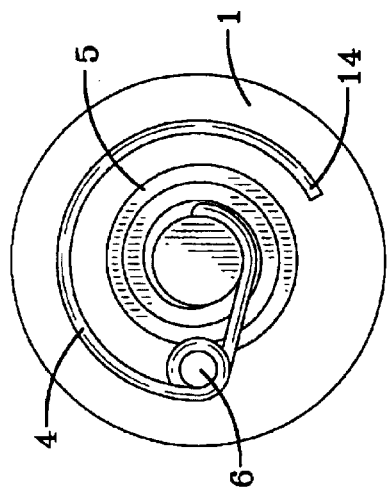
FIG. 3 is an end view of the spool for FIG. 2.
Figure 4:
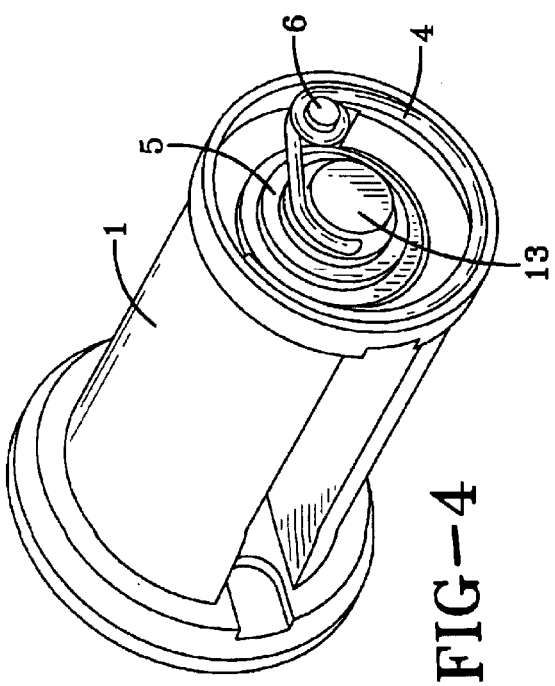
FIG. 4 is a perspective view of the spool of FIGS. 2 and 3.
Figure 2:
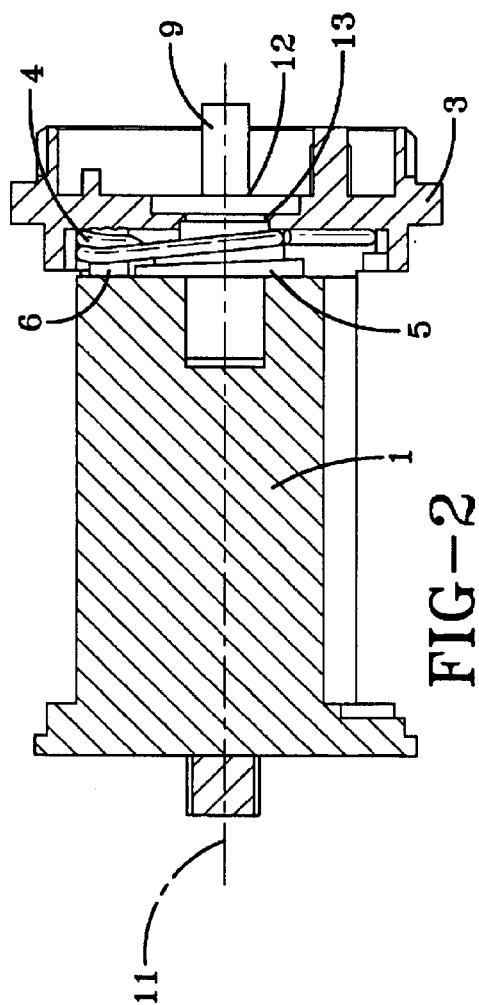
FIG. 2 is a cross sectional view of the spool of the seat belt retractor of FIG. 1 prior to load limiting.
Figure 5:
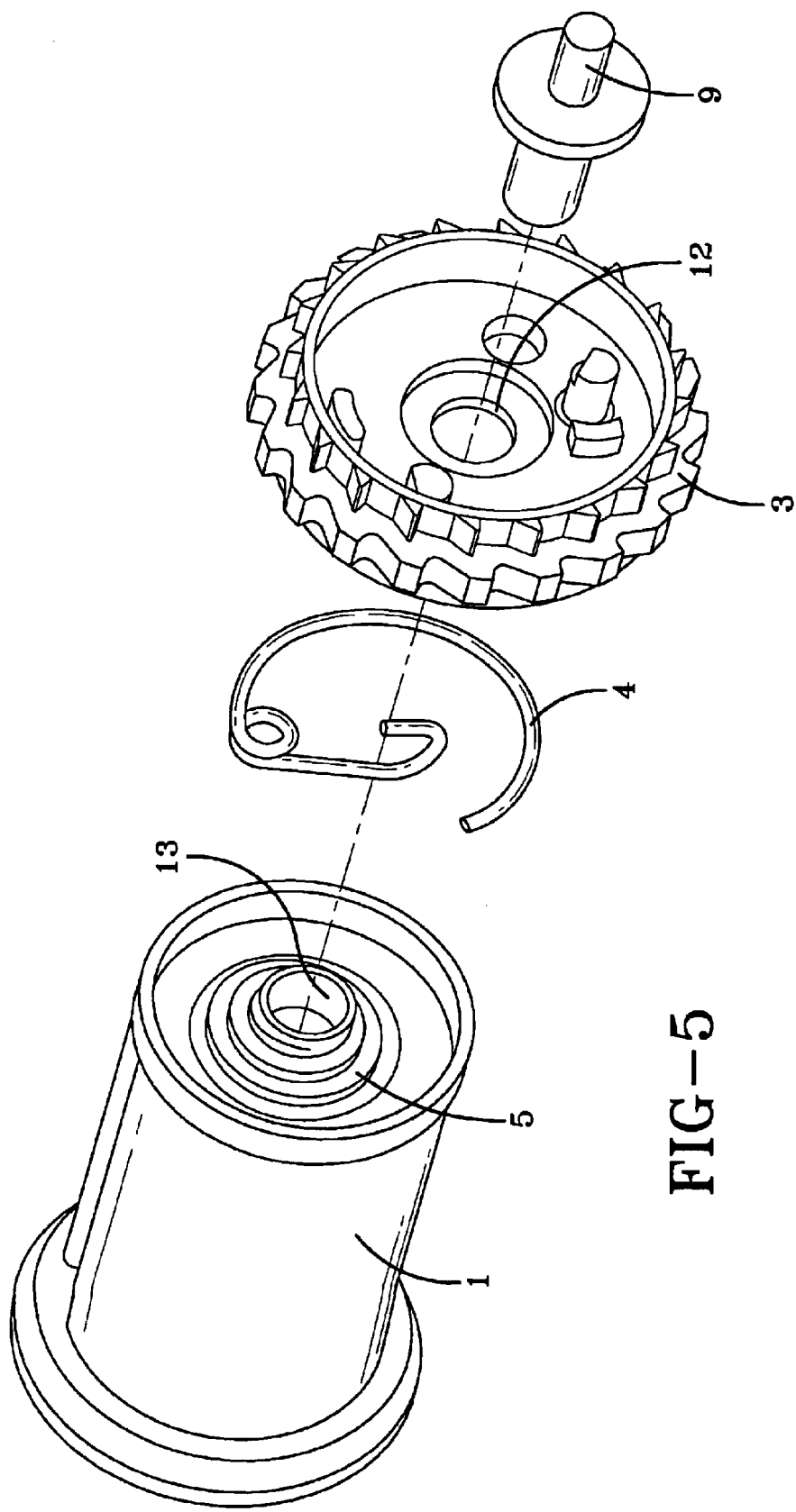
FIG. 5 is an exploded perspective view of the spool of FIGS. 2 to 4.

The seat belt retractor shown in FIG. 1 comprises a cylindrical retractor spool 1 mounted for rotation about a spindle 9 concentric with the spool axis in a frame 21 to wind in and pay-out seat belt webbing.

In a crash a sensor positioned at a location indicated by reference character 23 activates a locking pawl 22 to engage a toothed locking ring 3 fixed to one end of the spool to prevent rotation and begin the spool locking process. The other end of the spool is connected to a rewind spring which is a clock type coiled spring which biases the spool to a webbing rewound condition.

When a crash is detected the locking ring 3 is engaged by the locking pawl 22 and prevented from rotating. Subject to further movement due to load limiting arrangements the spool 1 is then locked against further rotation.

In FIGS. 2 to 5 the spool 1 is shown in more detail prior to load limiting. In FIG., 2 the spool 1 has an axis of rotation 11 and a winding drum in the form of a spiral formation 5 at one end of the spool. Preferably the winding drum is formed as a spiral so that the angle of the coil of wire changes gradually. This has the advantage of producing a relatively flat load-displacement graph, i.e. of absorbing the load applied to the webbing, in a crash situation, with the maximum efficiency. By modifying the contact point of the wire on the spiral almost any desired load limiting graph shape can be achieved: for example a linear, progressive, digressive, stepped or varying shape load limiting curve can be produced to suit the needs of the vehicle manufacturer. In particular the spiral could be formed such that the rotating wire jumps to a larger radius, thus decreasing the torque in a stepped manner to produce a two stage load limiting effect. The spiral can be integrated into the spool body (or the locking ring) or could alternatively be formed as a separate component which can be adapted to a customer's requirements each time without re-tooling the spool.

The winding drum/spiral formation 5 is attached to the spindle 9 that passes through a hole 12 in the locking ring 3 and into a hole 13 in the spiral formation 5. A wire 4 is fixed to the spool 1 and is coiled around the spiral formation 5. One end of the wire 4 is coiled around a pin 6 that is fixed to the locking ring 3. Preferably the wire is coiled around the pin a multiple number of turns. Energy is required to deform the wire (this is known as the capstan effect) and this creates the load limiting effect. The arrangement is shown in an end view in FIG. 3, in a perspective view in FIG. 4 and in an exploded view in FIG. 5, with like parts denoted by like reference numbers.

Preferably the wire is anchored to the spool and the pin or pins are mounted to the locking ring.

The wire may be performed from steel with a first straight portion or a slight curve followed by one or more coils and followed by a second straight portion. The pin can then be inserted through the coils.

FIGS. 6 to 8 show the spool during load limiting and like parts are denoted by like reference numbers. It can be seen that the wire 4 is now wound a number of turns onto the spiral formation 5 and the distance from the pin 6 to the free end 14 is much shorter because the wire 4 has been pulled around the pin 6.

Figure 9:
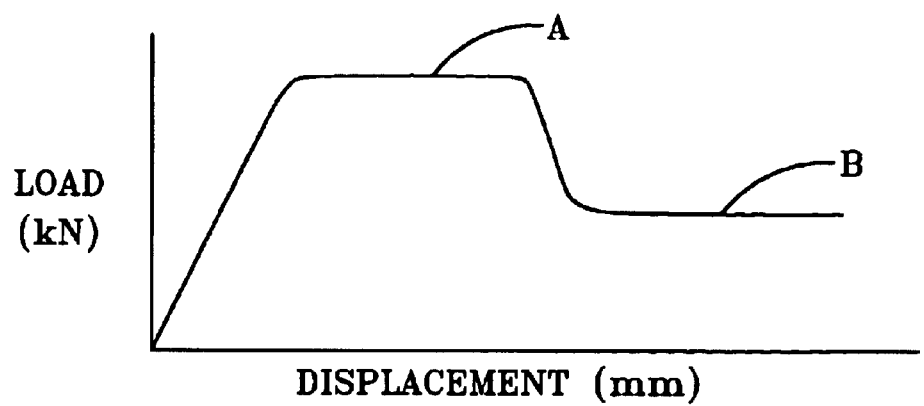
FIGS. 9 and 11 are graphs illustrating how load on the seat belt webbing changes compared to the displacement of the vehicle occupant for a seat belt retractor according to the present invention.
Figure 11:
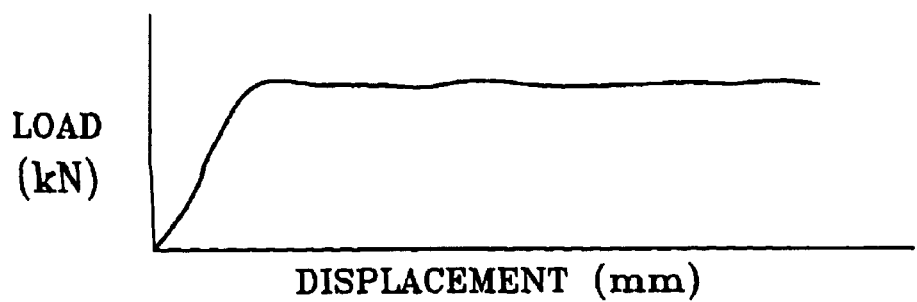

FIGS. 9 and 11 are graphs of load against displacement for the arrangement of FIGS. 1 to 8 with a variety of modifications.

The graph of FIG. 9 clearly shows two stage load limiting wherein state A is while the wire is uncoiling from the pin 9 at a relatively constant load because of the spiral shape of the formation around which it coils at its fixed end. The wire jumps to a bigger radius on the spiral at the start of stage B thus reducing the torque.

Figure 10:
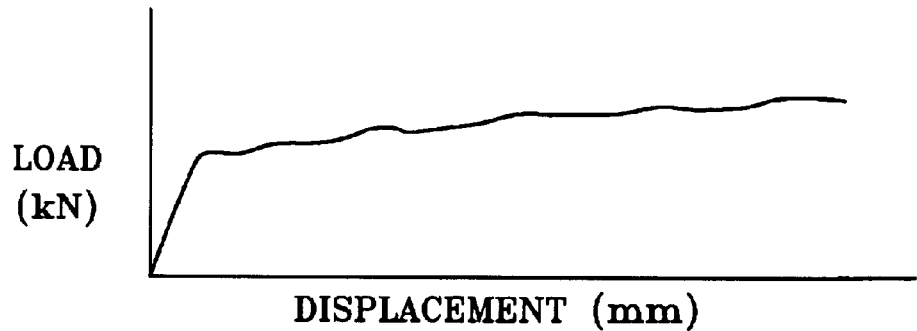
FIG. 10 is a graph illustrating how load on the seat belt webbing changes compared to the displacement of the vehicle occupant for a known seat belt retractor.

This is in contrast to the load against displacement graph for a standard torsion bar retractor as shown in FIG. 10 which indicates that traditionally the line of the graph rises as the webbing angle decreases and the torque increases.

The graph of FIG. 11 illustrates a flatter force curve which results from a more gradual change in the radius of the spiral formation 5. The advantage of this arrangement is that it is relatively cheap to implement and the load limiting effect can easily be changed by changing the diameter of the wire, the material of the wire, the number of turns of the wire around the pin, the pin diameter, number of pins, or number of wires.

While specific preferred embodiments and materials have been illustrated, described and identified, it is to be understood that the invention is in no way limited thereto since modifications may be made and other embodiments of the invention will occur to those of skill in the art to which this invention pertains. Thus, it is intended to cover any such modifications and other embodiments as incorporated the features of this invention within the full lawful scope of the allowed claims as follows.

What is claimed is:

1. A seat belt retractor comprising: a spool mounted for rotation in the retractor; a lacking ring attached to one end of the spool; a locking pawl for locking the locking ring against rotation in a crash; and load limiting means for allowing further pay-out of the seat belt webbing under the influence of a vehicle occupant's forward momentum after the locking ring has locked, wherein the load limiting means comprises a length of wire and a winding drum attached to one of the spool and the locking ring and a pin fixed to the other of the spool and the locking ring, wherein the wire is coiled around the pin, wherein the winding drum is formed as a spiral whereby when there is relative movement between the spool and the locking ring the wire is pulled around the pin and is wound onto the winding drum.

2. The retractor according to claim 1 wherein the wire is coiled around the pin a multiple number of turns.

3. The seat belt retractor according to claim 2 wherein the winding drum is formed as a spiral so that the angle of the coil of wire changes gradually.

4. The seat belt retractor according to claim 1 wherein the contact point of the wire on the spiral is chosen to determine the desired load limiting effect.

5. The seat belt retractor according to claim 4, wherein the spiral is formed such that the rotating wire jumps to a larger radius, decreasing the torque in a stepped manner to produce a two stage load limiting effect.

6. The seat belt retractor according to claim 1 wherein the spiral is integrated into a body of the spool.

7. The seat belt retractor according to claim 1 wherein the spiral is integrated into the locking ring.

8. The seat belt retractor according to claim 1 wherein the wire is anchored to the spool and the pin or pins are mounted to the locking ring.

9. The scat belt retractor according to claim 1 wherein the wire is preformed from steel with a first straight portion or a slight curve followed by one or more coils and followed by a second straight portion and the pin is inserted through the coils.

10. The seat belt retractor according to claim 1 wherein the wire is arranged to wrap radially on at least one pin.

11. The seat belt retractor according to claim 1 wherein the wire is arranged to wrap axially on the pin or pins.

12. The seat belt retractor according to claim 1 wherein load limiting can be changed by changing the diameter of the wire, the material of the wire, the number of turns of the wire around the pin, the pin diameter, the number of pins, or the number of wires.

13. The seat belt retractor according to claim 1 wherein load limiting can be changed by changing the diameter of the wire.

14. The seat belt retractor according to claim 1 wherein load limiting can be changed by changing the material of the wire.

15. The seat belt retractor according to claim 1 wherein load limiting can be changed by changing the number of turns of the wire around the pin.

16. The seat belt retractor according to claim 1 wherein load limiting can be changed by changing the diameter of the pin.

17. The seat belt retractor according to claim 1 wherein load limiting can be changed by changing the number of pins.

18. The seat belt retractor according to claim 1 wherein load limiting can changed by changing the number of wires.

* * * * *